US009479240B1

(12) United States Patent
Caire et al.

(10) Patent No.: US 9,479,240 B1
(45) Date of Patent: Oct. 25, 2016

(54) COMPOSITE BEAMFORMING TO COORDINATE CONCURRENT WLAN LINKS

(71) Applicant: Quantenna Communications, Inc., Fremont, CA (US)

(72) Inventors: Giuseppe Caire, Berlin (DE); Konstantinos Psounis, Pacific Palisades, CA (US)

(73) Assignee: Quantenna Communications, Inc., Fremont, CA (US)

( * ) Notice: Subject to any disclaimer, the term of this patent is extended or adjusted under 35 U.S.C. 154(b) by 95 days.

(21) Appl. No.: 14/612,293

(22) Filed: Feb. 2, 2015

Related U.S. Application Data

(60) Provisional application No. 61/934,147, filed on Jan. 31, 2014, provisional application No. 61/996,096, filed on Apr. 29, 2014.

(51) Int. Cl.

| | |
|---|---|
| *H04W 4/00* | (2009.01) |
| *H04B 7/06* | (2006.01) |
| *H04B 7/04* | (2006.01) |
| *H04W 72/04* | (2009.01) |
| *H04W 74/08* | (2009.01) |

(Continued)

(52) U.S. Cl.
CPC .......... *H04B 7/0617* (2013.01); *H04B 7/0413* (2013.01); *H04B 7/061* (2013.01); *H04B 7/0626* (2013.01); *H04L 27/2646* (2013.01); *H04W 72/042* (2013.01); *H04W 72/044* (2013.01); *H04W 74/0816* (2013.01); *H04W 84/12* (2013.01)

(58) Field of Classification Search
None
See application file for complete search history.

(56) References Cited

U.S. PATENT DOCUMENTS

| 5,839,053 A | 11/1998 | Bosch et al. |
| 7,324,442 B1 | 1/2008 | Pan et al. |

(Continued)

FOREIGN PATENT DOCUMENTS

| EP | 1447934 A1 | 8/2004 |
| EP | 1447936 A1 | 8/2008 |

(Continued)

OTHER PUBLICATIONS

A. Farajidana, et al.; "3GPP LTE Downlink System Performance", IEEE Globcom 2009.

(Continued)

*Primary Examiner* — Otis L Thompson, Jr.
(74) *Attorney, Agent, or Firm* — IP Creators; Charles C. Cary

(57) ABSTRACT

A system for coordinating a WLAN including MIMO WAP nodes supporting WLAN communications with an associated set of station nodes on a shared OFDM communication channel. A primary beam coordinator aggregates channel state information (CSI) for communication links and cross-links between each WAP node and both associated and non-associated station nodes and extrapolates therefrom spatially distinct primary beam pattern setup options for each of the WAP nodes to enable substantially non-interfering concurrent downlink communications between each WAP node and a corresponding subset of its associated station nodes. The WAP nodes select a corresponding one of the primary beam options together with its associated stations as provided by the primary beam coordinator and generate the corresponding selected primary beam option for subsequent downlink communications to the associated subset of station nodes.

12 Claims, 9 Drawing Sheets

Collision Free Coordinated Composite Beamforming
Primary Beams during Interval $t_7$-$t_{7+\Delta}$

(51) Int. Cl.
H04W 84/12 (2009.01)
H04L 27/26 (2006.01)

(56) References Cited

U.S. PATENT DOCUMENTS

| | | | |
|---|---|---|---|
| 8,472,963 B2 | 6/2013 | Caire | |
| 8,638,746 B2 | 1/2014 | Papadopoulos et al. | |
| 8,675,511 B2 | 3/2014 | Gorokhov et al. | |
| 8,824,330 B2 | 9/2014 | Van Rensburg et al. | |
| 9,078,153 B1* | 7/2015 | Schelstraete | H04W 88/08 |
| 2002/0138511 A1 | 9/2002 | Psounis et al. | |
| 2006/0040707 A1 | 2/2006 | Kish et al. | |
| 2009/0185607 A1 | 7/2009 | Lee et al. | |
| 2010/0040006 A1 | 2/2010 | Caire | |
| 2010/0040163 A1 | 2/2010 | Caire et al. | |
| 2010/0041407 A1 | 2/2010 | Caire et al. | |
| 2010/0041408 A1 | 2/2010 | Caire et al. | |
| 2010/0159930 A1* | 6/2010 | Hagerman | H01Q 3/04 455/436 |
| 2010/0322327 A1 | 12/2010 | Caire et al. | |
| 2011/0002373 A1* | 1/2011 | Jeon | H04B 7/043 375/228 |
| 2011/0032849 A1* | 2/2011 | Yeung | H04B 7/0434 370/280 |
| 2011/0110449 A1 | 5/2011 | Ramprashad et al. | |
| 2012/0039385 A1 | 2/2012 | Yilmaz et al. | |
| 2012/0113953 A1 | 5/2012 | Papadopoulos et al. | |
| 2012/0127869 A1* | 5/2012 | Yin | H04L 1/0031 370/252 |
| 2013/0273950 A1 | 10/2013 | Sun et al. | |
| 2013/0331136 A1 | 12/2013 | Yang et al. | |
| 2013/0336270 A1* | 12/2013 | Nagata | H04W 16/28 370/329 |
| 2014/0044041 A1* | 2/2014 | Moshfeghi | H04W 84/00 370/328 |
| 2014/0094164 A1 | 4/2014 | Hwang et al. | |
| 2014/0113600 A1 | 4/2014 | Gamal et al. | |
| 2014/0211779 A1 | 7/2014 | Caire et al. | |
| 2014/0362810 A1 | 12/2014 | Shirani-Mehr et al. | |
| 2015/0071368 A1* | 3/2015 | Lau | H04B 7/0417 375/267 |
| 2015/0110046 A1* | 4/2015 | Merlin | H04B 7/0452 370/329 |
| 2015/0124688 A1* | 5/2015 | Xu | H04B 7/0452 370/312 |
| 2015/0124732 A1* | 5/2015 | Seo | H04L 5/0048 370/329 |
| 2016/0037560 A1* | 2/2016 | Liu | H04L 51/34 370/329 |
| 2016/0127019 A1* | 5/2016 | Schelstraete | H04B 7/0617 370/252 |

FOREIGN PATENT DOCUMENTS

| | | |
|---|---|---|
| WO | 2013176962 A1 | 11/2013 |
| WO | 2014039098 A1 | 3/2014 |

OTHER PUBLICATIONS

P. Viswanath, et al.; "Sum Capacity of the Vector Gaussian Broadcast Channel and Uplink-Downlink Duality"; IEEE Transactions on Information Theory, vol. 49, No. 8 Aug. 2003.
G. Caire et al.; "On the Achievable Throughput of a MultiAntenna Gaussian Broadcast Channel"; IEEE Transactions on Information Theory, vol. 49, No. 7, Jul. 2003.
W. Yu et al.; "Sum Capacity of Gaussian Vector Broadcast Channels"; IEEE Transactions on Information Theory, vol. 50, No. 9, Sep. 2004.
H. Weingarten et al.; "The Capacity Region of the Gaussian Multiple-Input Multiple-Output Broadcast Channel" IEEE Transactions on Information Theory, vol. 52, No. 9, Sep. 2006.
H. V. Balan et al.; "Air Sync: Enabling Distributed Multiuser MIMO with Full Spatial Multiplexing"; IEEE ACM Transactions on Networking, 2012.
H. Yang et al.; "Performance of Conjugate and Zero-Forcing Beamforming in Large-Scale Antenna Systems"; IEEE Journal on Selected Areas in Communications, vol. 31, No. 2, Feb. 2003.
Y. Chen et al.;"Exact and Stable Covariance Estimation from Quadratic Sampling via Convex Programming"; arXiv:1310.0807v4 [cs.IT], Dec. 2013.
S. Kumar et al.; "Bringing Cross-Layer MIMO to Today's Wirless LANs"; SIGCOMM Hong Kong, China, Aug. 2013.
X. Liu et al.; "DIRC: Increasing Indoor Wireless Capacity using Directional Antennas"; SIGCOMM '09 Barcelona, Spain, Aug. 2009.
Z. Tan et al.;"Direction of Arrival Estimation Using Co-Prime Arrays: A Super Resolution Viewpoint"; arXiv:1312. 7793v1 [cs.IT], Dec. 2013.
A. Michaloliakos et al.;"Efficient MAC for Distributed Multiuser MIMO Systems"; Wireless On-Demand Network Systems and Services (WONS), 2013 10th Annual Converence on, Mar. 2013, Banff AB Canada.
S. Vishwanath et al.;"Duality, Achievable Rates, and Sum-Rate Capacity of Gaussian MIMO Broadcast Channels"; IEEE Transactions on Information Theory, vol. 49, No. 10 Oct. 2003.
S. Parkvall et al.; "LTE-Advanced—Evolving LTE towards IMT-Advanced"; Vehicular Technology Converence, 2008 VTC 2008—Fall. IEEE 68th Calbary BC Canada.
H. V. Balan et al.; "Achieving High Data Rates in a Distributed MIMO System"; MobiCom '12 Autust 2012 Istanbul, Turkey.
JB Landre et al.; "Realistic Performance of HSDPA MIMO in Macro-Cell Environment"; Personal, Indoor and Mobile Radio Communications, 2009 IEEE 20th International Symposium on Sep. 2009, Tokyo.
H. Rahul et al.; "JMB: Scaling Wireless Capacity with User Demands"; SIGCOMM'12 Helsinki Finland Aug. 2012.
A. Adhikary et al.;"Joint Spatial Division and Multiplexing—The Large Scale Array Regime"; IEEE Transactions on Information Theory, vol. 59, No. 10, Oct. 2013.
J. Nam et al.; "Joint Spatial Division and Multiplexing—: Realizing Massive MIMO Gains with Limited Channel State Information"; Information Sciences and Systems (CISS), 2012 46th Annual Conference on Mar. 2012.
A. Adhikary et al.; "Joint Spatial Division and Multiplexing for mm-Wave Channels"; IEEE Journal on Selected Areas in Communications, vol. 32, No. 6, Jun. 2014.
J. Nam et al.; "Joint Spatial Division and Multiplexing: Opportunistic Beamforming, User Grouping and Simplified Downlink Scheduling" IEEE Journal of Selected Topics in Signal Processing, vol. 8, No. 5, Oct. 2014.
H. Huh et al.; "Achieving 'Massive MIMO' Spectral Efficiency with a Not-so-Large Numer of Antennas"; IEEE Transactions on Wireless Communications, vol. 11, No. 9, Sep. 2012.
J. Hoydis et al.; "Massive MIMO in the UL/DL of Cellular Networks: How Many Antennas do we Need?"; IEEE Journal on Selected Areas in Communications, vol. 31, No. 2, Feb. 2013.
E. J. Candes et al.; "Exact Matrix Completion via Convex Optimization"; Foundation of Computational Mathematics (2009) 9:717-772.
X. Zhang et al.; "NEMOx: Scalable Network MIMO for Wireless Networks"; MobiCom '13 Sep. 2013 Miami Florida.
T. L. Marzetta; "Noncooperative Cellular Wireless with Unlimited Numbers of Base Station Antennas"; IEEE Transactions on Wireless Communications, vol. 9, No. 11, Nov. 2010.
L. Balzano et al.; "Online Identification and Tracking of Subspaces from Highly Incomplete Information"; arXiv:1006.4046v2 [cs.IT] Jul. 2011.
J. Jose et al.; "Pilot Contamination and Precoding in Multi-Cell TDD Systems"; IEEE Transactions on Wireless Communications, vol. 10; No. 8 Aug. 2011.
J. He et al.; "Online Robust Subspace Tracking from Partial Information"; arXiv:1109.3827v2 [cs.IT] Sep. 2011.
H.V. Balan et al.; "USC SDR, an Easy-to-Program, High Data Rate, Real Time Software Radio Platform"; SRIF'13 Aug. 2013 Hong Kong, China.

* cited by examiner

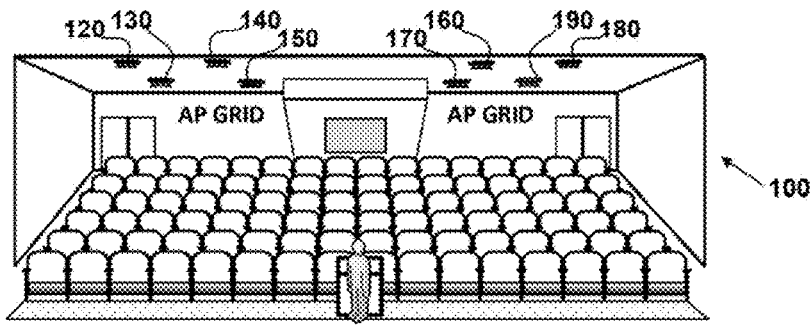
FIG. 1A   PRIOR ART:   ENTERPRISE WLAN GRID
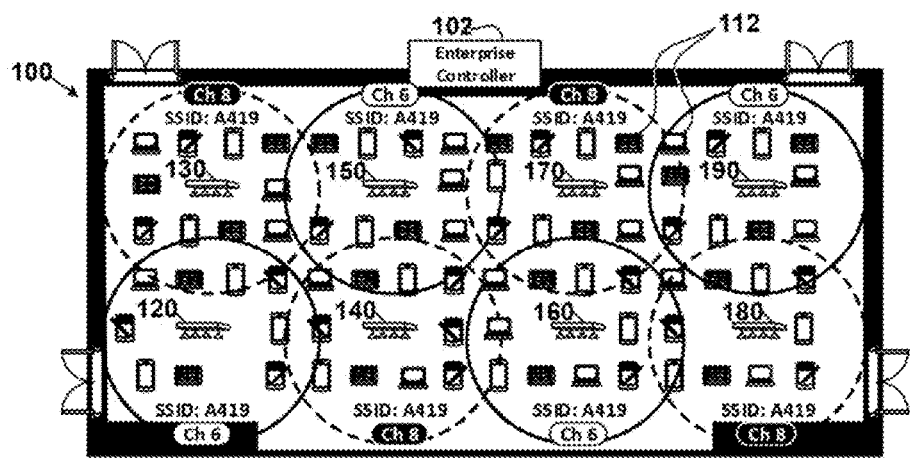
FIG. 1B   PRIOR ART:   ADJACENT WAPS DIFFERENT CHANNEL
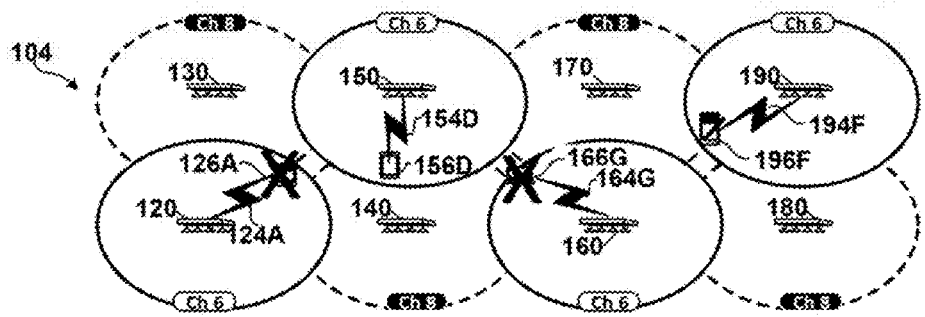
Energy from Link 154D blocks Links 124A & 164G
FIG. 1C   PRIOR ART:   PROXIMATE WAPs SENSE COLLISION
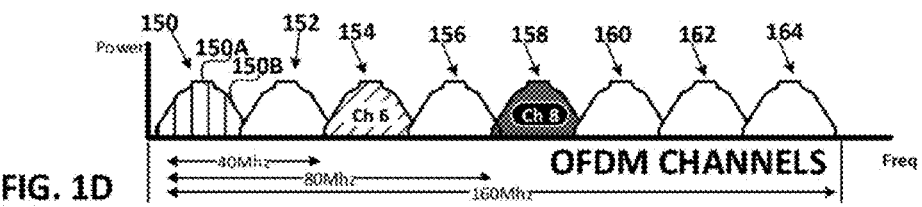
FIG. 1D

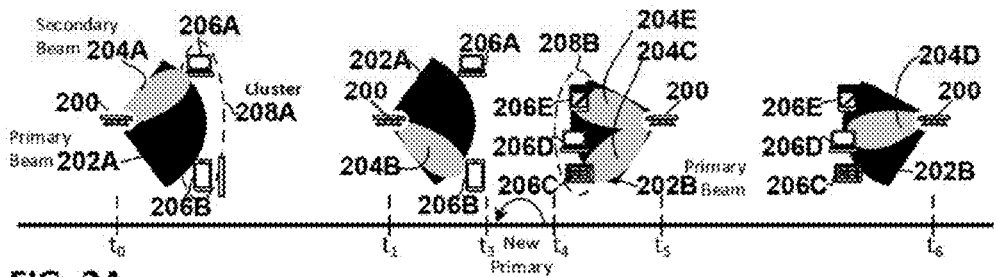
FIG. 2A  Composite Beamforming
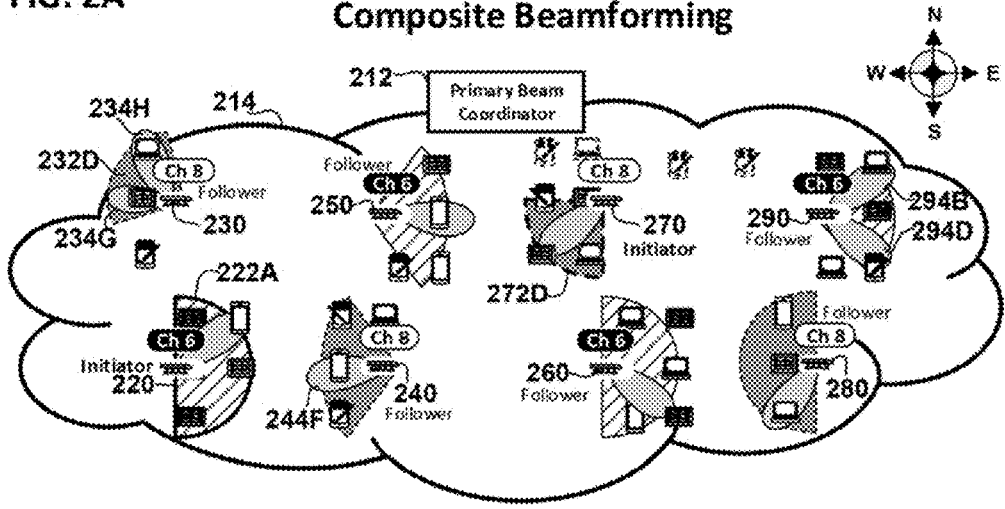
FIG. 2B  Collision Free Coordinated Composite Beamforming
Primary Beams during Interval $t_7$-$t_{7+\Delta}$
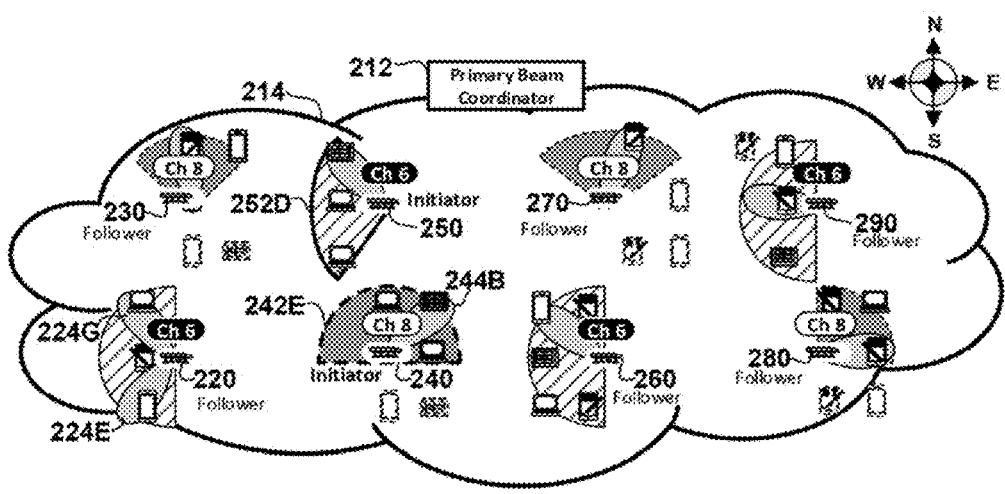
FIG. 2C  Collision Free Coordinated Composite Beamforming
Primary Beams During Interval $t_8$-$t_{8+\Delta}$ Aggregate Link & X-Link Channel Estimates Identify Client Clusters & Non-Interfering Primary Beam Patterns

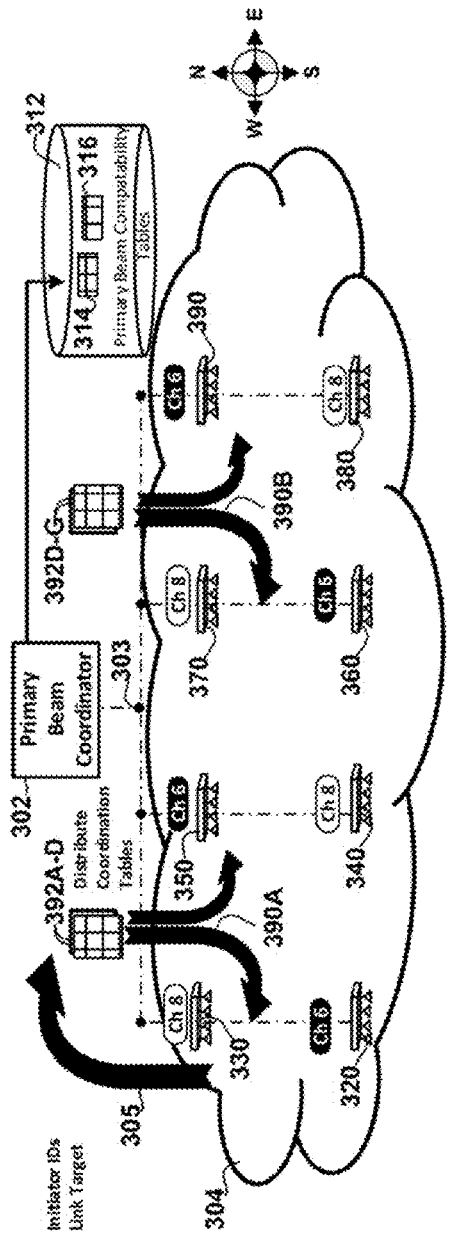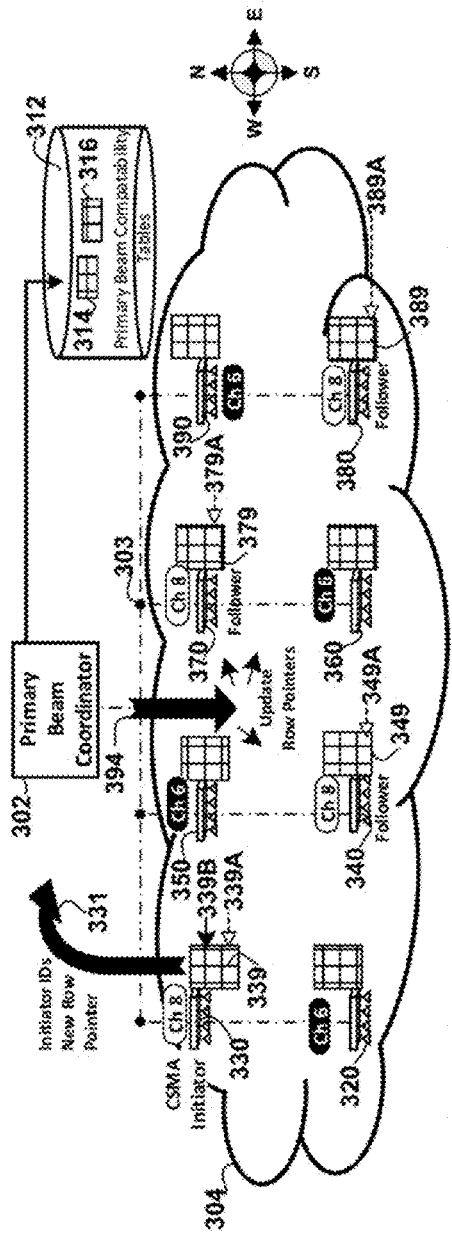
FIG. 3C  Distribution of Updated Non-Interfering Primary Beam Coordination Options
FIG. 3D  Notification of Change in Selected Coordination Option in Existing Table

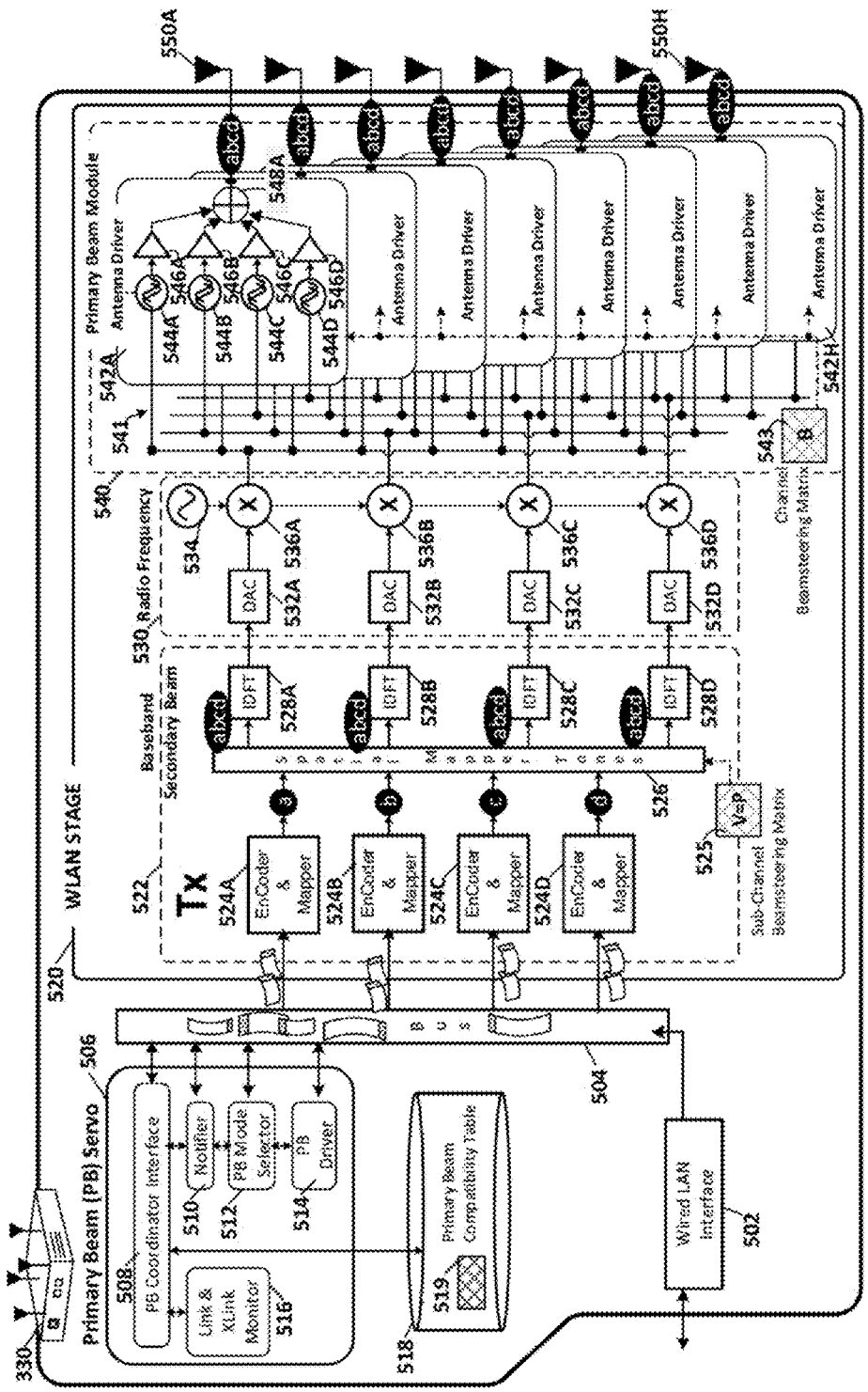
FIG. 5A  MIMO WAP with Steerable RF Primary Beam (Phased Array Antenna)

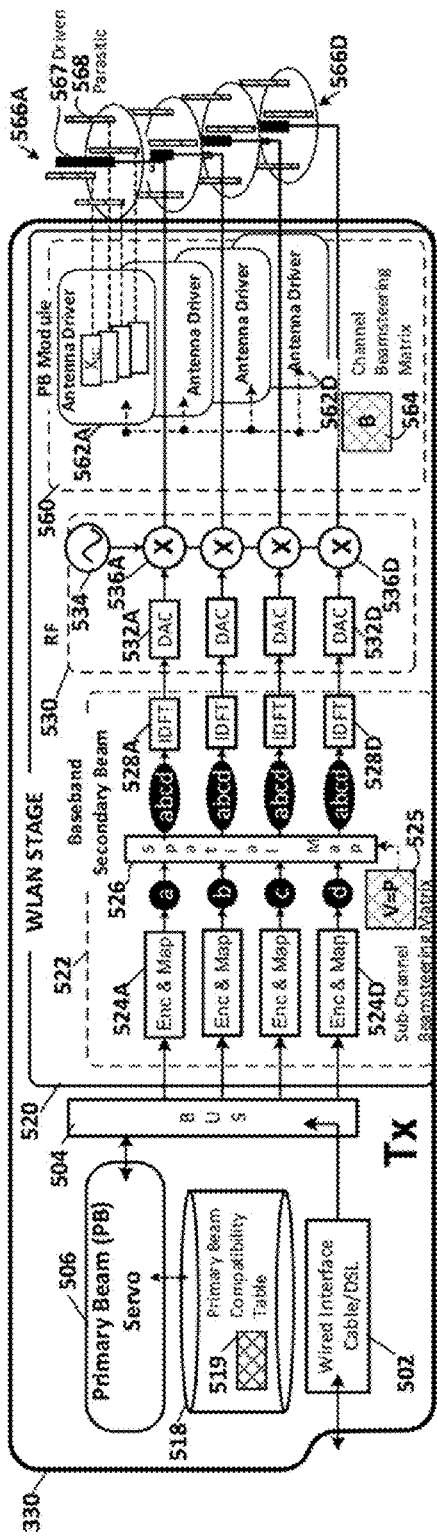
FIG. 5B  MIMO WAP with Steerable RF Primary Beam (Steerable Parasitic Antennas)
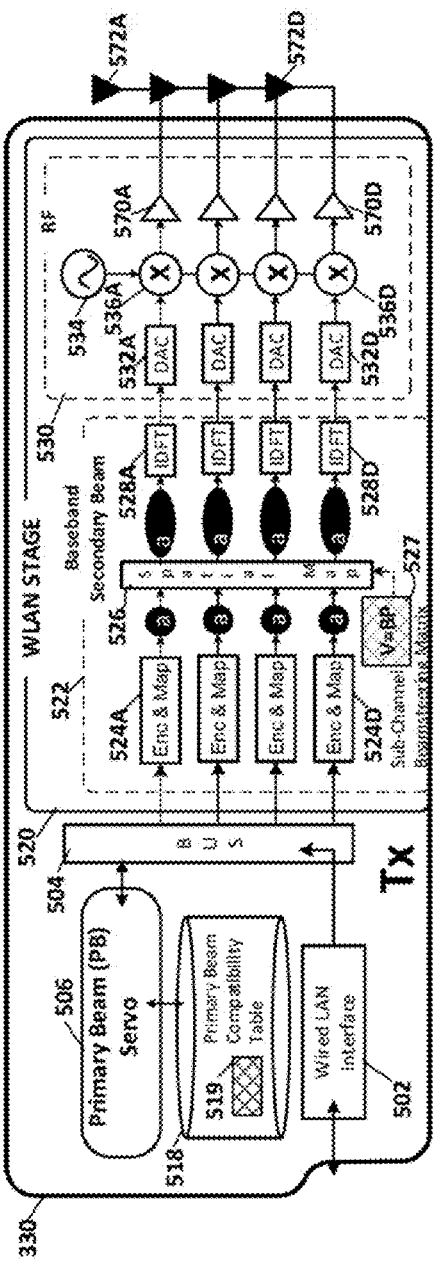
FIG. 5C  MIMO WAP with Steerable Primary and Secondary Beams

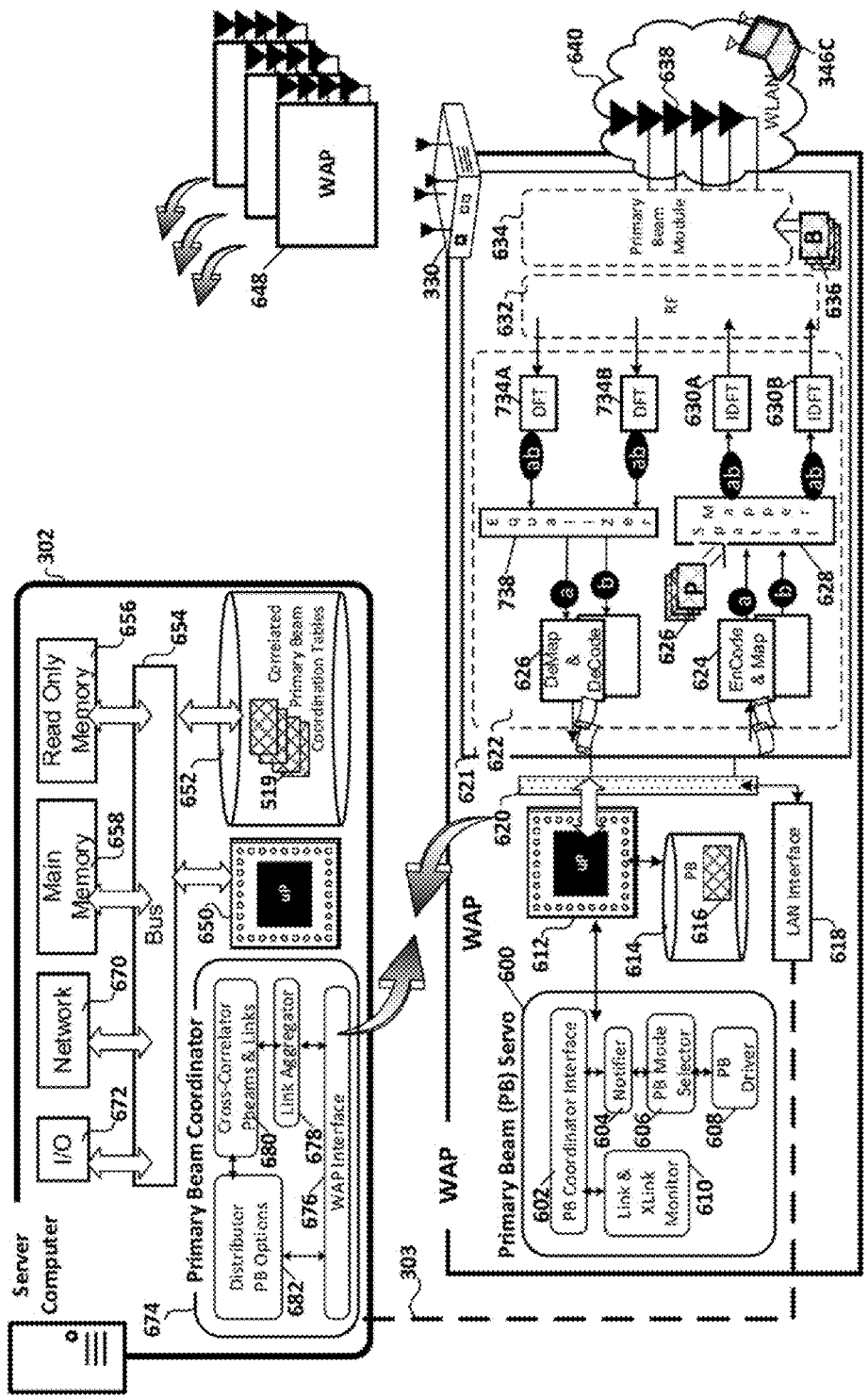
FIG. 6  SYSTEM for Composite Beamforming to Coordinate Concurrent WLAN Links

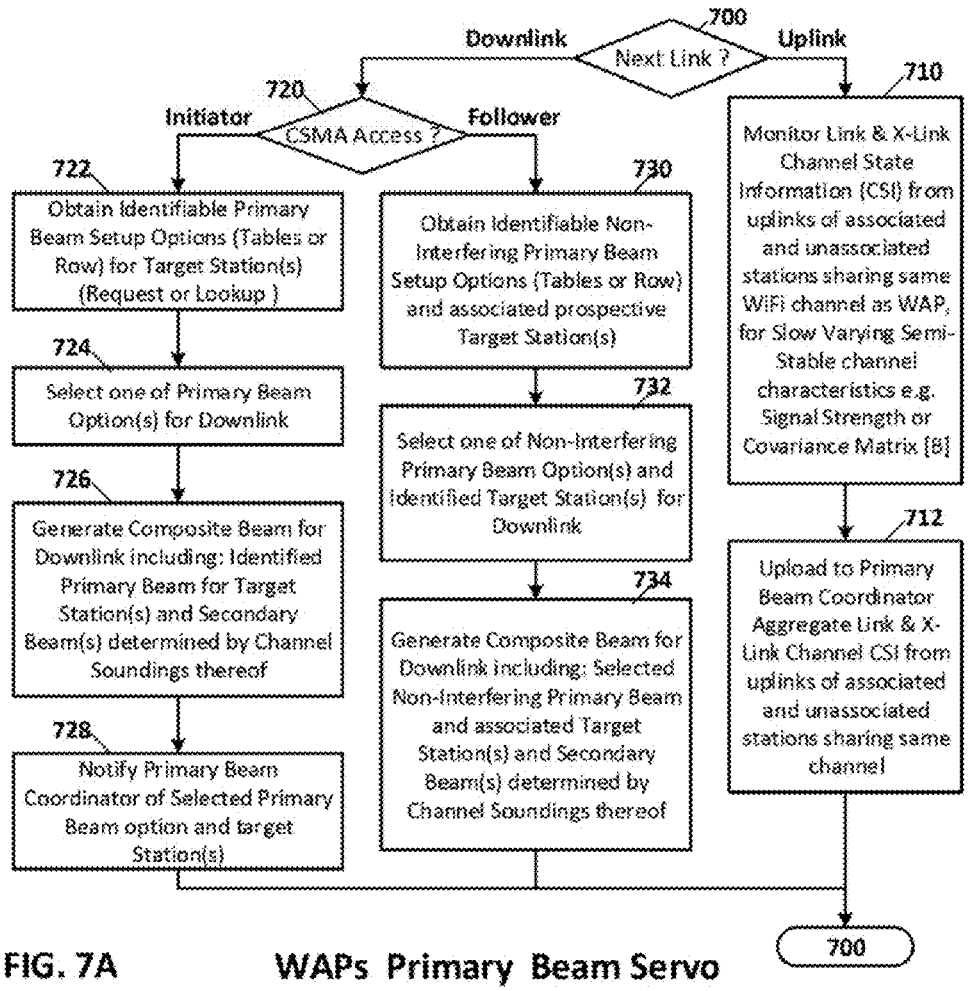
FIG. 7A    WAPs Primary Beam Servo
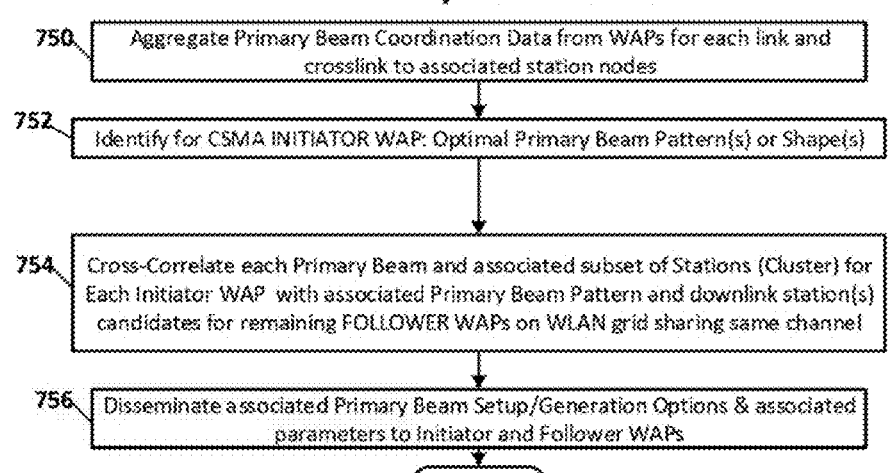
FIG. 7B    Server Primary Beam Coordinator

COMPOSITE BEAMFORMING TO COORDINATE CONCURRENT WLAN LINKS

CROSS REFERENCE TO RELATED APPLICATION

This application claims the benefit of prior filed Provisional Application No. 61/934,147 filed on Jan. 31, 2014 entitled "Inter-Cell Interference Management via Reconfigurable Beamforming in the RF Domain" and Provisional Application No. 61/996,096 filed on Apr. 29, 2014 entitled "Coordinated Joint Beam Selection and User Scheduling in a Cluster of Multiple Access Points" both of which are incorporated herein by reference in their entirety as if fully set forth herein.

BACKGROUND OF THE INVENTION

1. Field of Invention

The field of the present invention relates in general to wireless local area networks including wireless access points (WAP) and wireless stations and methods of coordinating transmissions thereon.

2. Description of the Related Art

Enterprise wireless networks, a.k.a. wireless local area networks (WLAN) are established using multiple centrally controlled devices called Wireless Access Points (WAP)s. Each WAP wirelessly couples all associated devices, e.g. wireless stations such as: computers, printers, televisions, security cameras across the entire enterprise to one another and to the Internet. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the protocols, e.g. "a", "b", "g", "n", "ac", "ad" specified in the IEEE 802.11 standard. Communications follow a hub and spoke model with each WAP at the hub and the spokes corresponding to the wireless links to each 'client' device. A communication between from a transmitting WAP and one of its associated receiving stations is identified as a downlink communication. Conversely, a communication from a transmitting station to its receiving WAP with which it is associated is identified as an uplink communication.

After a central controller selects a communication channel for each WAP, access to the communication channel relies on a multiple access methodology identified as Collision Sense Multiple Access (CSMA). CSMA is a distributed random access methodology first introduced for home wired networks such as Ethernet for sharing a single communication medium, by having a contending communication link back off and retry access to the line if a collision is detected, i.e. if the wireless medium is in use. A WLAN operative in this manner is said to implement: CSMA\CA where the "CA" moniker signifies collision avoidance as the connectionless access coordination methodology.

Communications on the single communication medium are identified as "simplex" meaning, communications from a single source node to one target node at one time, with all remaining nodes capable of "listening" to the subject transmission. Starting with the IEEE 802.11ac standard and specifically 'Wave 2' thereof, discrete communications to more than one target node at the same time may take place using what is called Multi-User (MU) multiple-input multiple-output (MIMO) capability of the WAP. MU capabilities were added to the standard to enable the WAP to communicate with multiple single antenna single stream devices concurrently, thereby increasing the time available for discrete MIMO links to contending wireless devices.

An Enterprise WLAN may consist of hundreds or thousands of WAPs each supporting communications of hundreds of associated wireless communication devices and the Internet on its own sub-net and all collectively operating under control of the central controller. Each WAP uses the same Service Set Identifier (SSID) for station association. To increase network throughput the central controller will typically assign the different channels to selected subsets of the WAPS. This allows concurrent communications to take place on different channels while still maintaining compliance with the CSMA\CA protocol. Unfortunately, such throughput improvements achieved by frequency separation come at the price of decreased bandwidth for communications, which of course has its own countervailing effect on throughput. This tradeoff is particularly noticeable in the more recent IEEE 802.11 compliant protocols such as 802.11ac. This protocol allows channel aggregation of the many discrete 20 Mhz channels into aggregate channels totaling 160 Mhz. This broad bandwidth may be required for wireless video conferencing devices and other low latency high throughput enterprise devices. Thus the central controller is left with the tradeoffs between frequency separation between proximate WAPs at the price of decreased bandwidth.

What is needed are improved methods for increased throughput options on Enterprise wireless local area networks (WLAN).

SUMMARY OF THE INVENTION

The present invention provides a system, method and apparatus for increasing overall communication throughput on wireless local area network (WLAN) comprising a plurality of multiple-input multiple-output (MIMO) Wireless Access Points (WAP)s communicating with associated stations which are all compliant, with one or more of the protocols e.g. "a", "b", "g", "n", "ac", "ad" within the IEEE 802.11 standard.

In an embodiment of the invention a system for coordinating a WLAN including a plurality of MIMO WAP nodes each supporting WLAN communications with an associated set of station nodes on a shared OFDM communication channel is disclosed. The system comprises a primary beam coordinator and the plurality of WAP nodes. The primary beam coordinator couples to the plurality of WAP nodes and is configured to aggregate channel state information (CSI) for communication links and crosslinks between each WAP node and both associated and non-associated station nodes thereof and to extrapolate therefrom spatially distinct primary beam pattern setup options to each of the plurality of WAP nodes to enable substantially non-interfering concurrent downlink communications between each WAP node and a corresponding subset of its associated station nodes within each associated spatially distinct primary beam. The plurality of WAP nodes are each coupled to the primary beam coordinator and configured to select a corresponding one of the primary beam options together with its associated stations as provided by the primary beam coordinator and to generate the corresponding selected primary beam option for subsequent downlink communications to at least one of the associated subset of station nodes; thereby increasing a downlink throughput of the WLAN via non-interfering concurrent downlink communications thereon.

The invention may be implemented in hardware, firmware or software.

Associated apparatus and methods are also claimed.

BRIEF DESCRIPTION OF THE DRAWINGS

These and other features and advantages of the present invention will become more apparent to those skilled in the art from the following detailed description in conjunction with the appended drawings in which:

FIGS. 1A-D are respectively a prior art elevation view, plan view, network view and channel bandplan for a representative prior art Enterprise wireless local area network (WLAN);

FIGS. 2A-C are respectively a beamforming diagram and network diagrams for an embodiment of the invention for coordinating concurrent 1Q Enterprise WLAN links;

FIGS. 3A-D are network diagrams of various stages of the coordination of concurrent Enterprise WLAN links in accordance with an embodiment of the invention;

FIGS. 5A-C are detailed hardware block diagrams of a wireless access point (WAP) showing alternate embodiments of the invention for generating a composite beam for downlink communications including a primary beam specified by the primary beam coordinator and secondary beam determined by each WAP;

FIG. 6 is a hardware block diagram at a system level of both the primary beam coordinator coupled to all WAPs and the primary beam servo in each WAP in an embodiment of the current invention; and FIGS. 7A-B are process flow diagrams of the processes associated with coordinating concurrent WLAN links on both the primary beam coordinator coupled to all WAPs and the primary beam servo in each WAP, in accordance with an embodiment of the current invention.

DETAILED DESCRIPTION OF THE EMBODIMENTS

Figure 3A:
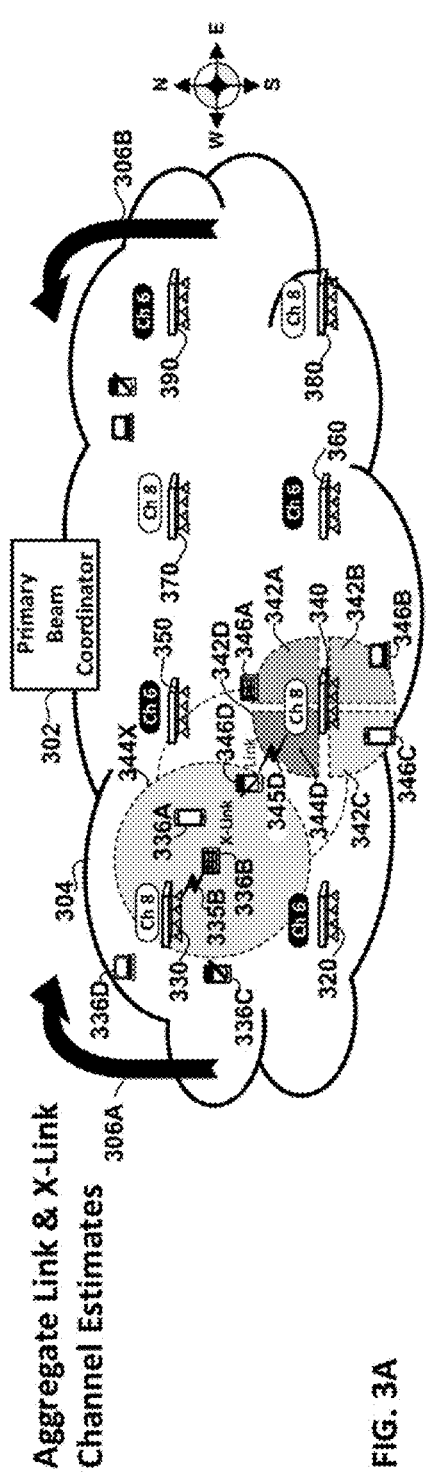

FIGS. 1A-D are respectively a prior art elevation view, plan view, network view and channel bandplan for a representative prior art Enterprise wireless local area network (WLAN).

FIG. 1A is the elevation view of a prior art enterprise WLAN deployed in a school or business auditorium 100. WLAN service is provided to the thousands of people in the audience and their associated wireless devices via a grid of WAPs 120-190 positioned across the ceiling of the auditorium.

FIG. 1B shows the plan view of the prior art Enterprise WLAN shown in FIG. 1A. Each of WAPs 130, 140, 170 and 180 operated on one of the selectable communication channels, e.g. Channel 8. Remaining WAPs 120, 150, 160, 190 operate on another of the selectable communication channels, e.g. Channel 6. This frequency separation allows for increased concurrency in WLAN communications at the expense of limited bandwidth. All WAPs are coupled to the Enterprise controller 102 which controls channel selection for all the WAPs. Each WAP services its own associated set of stations 112. All WAPs share a common Service Set Identifier (SSID).

FIG. 1C shows the network view of the prior art Enterprise WLAN shown in FIG. 1B and specifically those WAPs 120, 150, 160, 190 operating on Channel 6. Even with Frequency separation allowing concurrent communications between adjacent WAPs which do not share the same channel it remains the case that there are still blocked downlinks among the stations associated with proximate WAPs which do share the same channel, in this example Channel 6. In the example shown WAP 150 gains access to the medium, i.e. Channel 6, for a downlink communication 154D to target station 156D. Downlinks from each WAP are not limited to a single target station. Using a technique identified as multi-user (MU) Multiple-Input Multiple-Output (MIMO) a single WAP may transmit to two or more stations concurrently. In any case adjacent WAPs 120 and 160 operate in a manner consistent with the Carrier Sense Multiple Access (CSMA) protocol identified as Collision Avoidance (CA), by detecting the energy from link 154D and avoid access to the channel and resultant interference with link 154D until that downlink is completed. Not all concurrent downlinks by different WAPs on the same channel are blocked. Where for Example there is sufficient separation between WAPs sharing the same channel, e.g. WAPs 150 and 190 concurrent downlinks can take place without mutual interference, e.g. downlink 194F from WAP 190 to station 196F. Nevertheless it remains the case with prior art Enterprise WEAN deployments that there any many blocked downlinks on adjacent WQAPS sharing the same communication channel.

FIG. 1D shows the network bandplan associated with a portion of the IEEE 802.11ac protocol. A number of 20 Mhz channels 150, 152, 154, 156, 158, 160, 162, 164 are shown. Each channel includes multiple sub-carriers, a.k.a. tones, a.k.a. sub-channels, e.g. tones 150A-B for channel 150. These channels may be allocated individually to each WAP but doing so would reduce practicable throughput for video conference and other low latency and high throughput wireless devices to unacceptably low levels. Alternately, channels can be aggregated with a single 160 MHz channel being allocated to each WAP, with the problem of unacceptably high levels of collision between downlinks of adjacent WAPs sharing the 160 Mhz aggregate communication channel.

FIGS. 2A-C are respectively a beamforming diagram and network diagrams for an embodiment of the invention for coordinating concurrent Enterprise WLAN links.

FIG. 2A is the beamforming diagram showing composite beamforms and associated RF signal strength patterns generated by WAP 200 at times $t_0$-$t_6$. Each composite beam shown at times $t_0$, $t_1$, $t_5$, and $t_6$ arises from the superposition of a primary beam shown in black and one or more secondary beams shown in grey and having a generally "tear drop" shape. These representations are illustrative only. Composite beams are shown at times $t_0$-$t_6$. The primary beam and or its associated setup parameters is identified by the primary beam coordinator 212 shown in the following FIGS. 2B-2C as coupled to all the WAPs. The secondary beams are determined by each WAP. At time $t_0$ WAP 200 has generated a composite beam consisting of primary beam 202A and a secondary beam 204A. A number of stations are associated with the WAP and only a cluster or subset 208A thereof fall within the coverage of primary beam 202A. The WAP determines which stations in the cluster to communicate with based on its own internal downlink demand indicators such as the depth of the associated transmit buffers for each target station in the cluster. At time $t_0$ WAP 200 has generated a secondary beam 204A to support the downlink communication with station 206A. At time $t_1$ WAP 200 has generated another secondary beam 204B to support the downlink communication with station 206B. Downlinks by WAP 200 to remaining ones of its associated stations requires a change in the spatial orientation of the primary beam which is shown to occur at time $t_3$ on the WAP 200. A primary beam 202B is shown along with its associated subset or cluster 208B of stations 206C, 206D, 206E associated therewith. Once again the WAP determines which stations in its associated cluster to communicate with based on its own internal downlink demand indicators such as the depth of the associated transmit buffers for each target station in the cluster. At time $t_5$ WAP 200 has generated secondary beams 204C, 204E to support MU-MIMO downlink communication to stations 206C, 206E respectively. At time $t_6$ WAP 200 chooses to communicate with another of the subset of stations which falls within the primary beam and in this case generates another secondary beam 204D to link it to another of the subset of stations that fall within primary beam 2026 in this case station 206D.

FIGS. 2B-2C are network diagrams showing coordination by primary beam coordinator 212 of the primary beam portion of each composite beam across the entire Enterprise WLAN 214 serviced by WAPs 220, 230, 240, 250, 260, 270, 280, 290. FIGS. 2B and 2C show representative WLAN operation during the intervals $t_7$-$t_{7+\Delta}$ and $t_8$-$t_{8+\Delta}$ respectively. The entire WLAN maintains CSMA\CA compliance with significantly increased throughput due to primary beam coordination between WAPs sharing the channel which results in a significant increase of concurrent downlinks that do not interfere with one another. All WAPs are shown with multi user or single user concurrent downlinks.

In FIG. 2B during time interval $t_{07}$-$t_{7+\Delta}$ WAP 220 obtains initial CSMA\CA access to channel 6 thus triggering the onset of coordinated concurrent downlinks by other temporarily "blocked" follower WAPs sharing the same channel, e.g. WAPs 250, 260, 290. WAP 290 generates downlinks on a primary beam and secondary beams 294B, 294D. When for example WAP 220 gains access to the medium, i.e. shared communication channel, e.g. channel "6", the remaining WAPs sharing that channel and detecting the access by WAP 220, back off trying to access the medium. This is consistent with CSMA\CA collision avoidance. However rather than wait for the initiator 220 to complete the downlink, the remaining WAPs receive notification from the primary coordinator as to primary beam patterns they can generate which do not spatially overlap with the primary beam pattern 222A used by WP 220. Similar coordination applies to the activity on the WAPs sharing channel 8. WAP 270 on channel 8, obtains initial CSMA access to the channel thus triggering the onset of coordinated concurrent downlinks by other temporarily "blocked" follower WAPs sharing the same channel. WAP 230 generates MU-MIMO downlinks on a composite beam comprising primary beam 232D and secondary beams 234G, 234H.

The propagation of this coordinating information triggered by the initiator WAP gaining access to the medium, i.e. the shared communication channel, takes time to propagate through the network to the other WAPs in follower mode, e.g. WAPs 250, 260, 290 for channel 6 and WAPs 230, 240, 280 for channel 8. This time is on the order of one or two symbol intervals and is why the time intervals are represented with the delta terminology.

In FIG. 2C during time interval $t_{08}$-$t_{8+\Delta}$ WAP 250 obtains initial CSMA\CA access to channel 6 and uses primary barn 252D for its downlink. This triggers the onset of coordinated concurrent downlinks by other temporarily "blocked" follower WAPs sharing the same channel, e.g. WAPs 220, 260, 290. Follower WAP 220 generates MU-MIMO downlinks on its designated primary beam and secondary beams 224E, 224G. Similar coordination applies to the activity on the WAPs sharing Channel 8. WAP 240 on channel 8, obtains initial CSMA access to the channel and generates a composite beam including primary beam 242E and secondary beam 244B. This triggers the onset of coordinated concurrent downlinks by other temporarily "blocked" follower WAPs sharing the same channel, e.g. WAPs 230, 270, 280.

FIGS. 3A-D are network diagrams of various stages of the coordination of concurrent Enterprise WLAN links in accordance with an embodiment of the invention. A primary beam coordinator 302 is shown coordinating downlink communications on the WLAN 304 including WAPs. 320, 330, 340, 350, 360, 370, 380, 390 to all stations, e.g. stations FIG. 3A is the network diagram of an aggregation stage in the coordination of concurrent Enterprise WLAN links in accordance with an embodiment of the invention. During this stage of operation link and crosslink channel state information (CSI) is uploaded from each WAP to the primary beam coordinator. A crosslink is an uplink from a transmitting station as monitored by a WAP with which it is not associated.

The data uploaded 306A-B by each WAP to the primary beam coordinator is the slow varying relatively stable portion of the CSI data associated with each link and crosslink. This data is used by the primary beam coordinator to determine primary beams and associated station subsets that are spatially isolatable from one another. In one embodiment of the invention each WAP includes an electronically steerable antenna array such as a phased array or an electronically steerable parasitic array. In this embodiment of the invention monitoring may include cycling the receive antenna array of each WAP through different spatial orientations while sampling each uplink and crosslink. In still another embodiment of the invention each WAP will upload CSI information sufficient for the central beam coordinator to identify a channel covariance matrix for each link and crosslink. Alternately, in another embodiment of the invention this information may be determined on each WAP and uploaded to the primary beam coordinator.

FIG. 3A shows an embodiment of the invention in which WAP 340 includes an electronically steerable phased or parasitic array. During uplinks from each of associated stations 346A-D, as well as during crosslinks resulting from uplinks of any non-associated stations sharing the same channel, e.g. stations 336A-D the WAP cycles its steerable directional receive array through each discrete or programmed receive sector 342A-D and monitors the difference in CSI parameters such as signal strength from each associated and non-associated station. This information is uploaded to the primary beam coordinator. In the specific example shown, the spatial monitoring by WAP 340 includes monitoring of an uplink 335D from station 346D to the WAP. WAP 340 is also shown monitoring a cross link 344X that it experiences as measurable energy or signal strength during the uplink 335B of non-associated station 336B to the WAP 330 with which it is associated. The crosslink interference 344X from is highest when the primary beam pattern utilized by WAP 340 is primary beam pattern 344D.

Figure 3B:
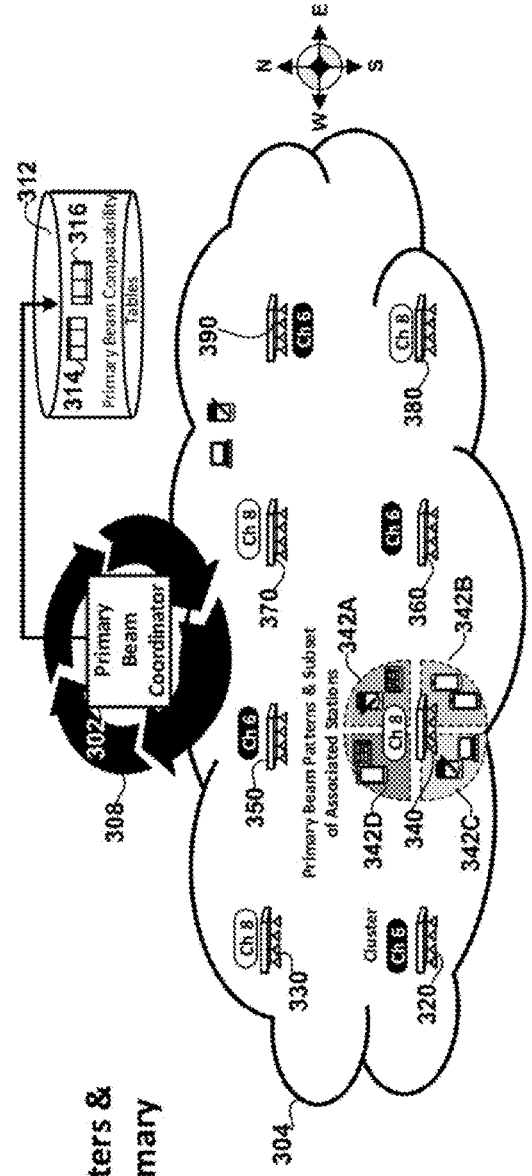

FIG. 3B is the network diagram of a spatial coordination stage in the coordination of concurrent Enterprise WLAN links in accordance with an embodiment of the invention. The primary beam coordinator includes a memory or storage 312 in which it stores the primary beam compatibility tables 314-316 that it extrapolates 308 from the CSI data uploaded from each WAP. The primary beam coordinator analyzes this data to extrapolate spatially non-interfering combinations of primary beam patterns and subset of associated stations, a.k.a. clusters associated with each. The data is exhaustively analyzed to determine for each initiating WAP and target station(s) an optimal primary beam and for each follower WAP trying to obtain concurrent access to the shared communication channel a spatially non-overlapping primary beam and subset of prospective associated stations for a downlink which does not interfere with the downlink of the initiator WAP. Representative primary beam patterns 342A-D for WAP 340 and the subset of associated stations covered by each primary beam pattern are shown.

FIG. 3C is the network diagram of a distribution stage in the coordination of concurrent Enterprise WLAN links in accordance with an embodiment of the invention. The primary beam coordinator is shown coupled to each WAP through a wired local area network (LAN) connection 303. Subsequent to analysis the WLAN the primary beam coordinator distributes 390A-B primary beam coordination options 392A-G to each WAP. The distribution may be proactive or reactive. Proactive distribution is periodic unsolicited downloading of primary beam coordination data options to all WAPs by the primary beam coordinator. This allows each WAP to already have possession of the relevant data for coordinating itself with other WAPs on the network. Reactive distribution is distribution of primary beam coordination data options to the requesting WAP and all effected. WAPS sharing the same channel in response to notification 305 that a particular WAP, e.g. WAP 330 which has gained access to the shared communication channel, e.g. channel "8".

FIG. 3D is the network diagram of an embodiment of the invention with a notification stage in the coordination of concurrent Enterprise WLAN links in accordance with an embodiment of the invention. In this embodiment of the primary beam coordinator has already proactively distributed updated primary beam coordination options to each WAP. Thus the notification e.g. notification 331 from initiating WAP 330, which has obtained CSMA\CA access to the channel, to the primary beam coordinator is simply a notification of a change from one primary beam pattern 339A identified in the primary beam coordination options table 339 to a new pattern 339B. In an embodiment of the invention the primary beam coordinator disseminates 394 this information, e.g. new row pointers, to all follower WAPS for which the access to the shared channel "8" would otherwise be temporarily blocked. Follower WAP 340 is shown with primary beam coordination options table 349 with a stale primary beam pattern pointer 349A which the primary beam coordinator will update. Follower WAP 370 is shown with primary beam coordination options table 379 with a stale primary beam pattern pointer 379A which the primary beam coordinator will update. Follower WAP 380 is shown with primary beam coordination options table 389 with a stale primary beam pattern pointer 389A which the primary beam coordinator will update. In another embodiment of the invention notification is made to the primary beam coordinator as well as directly from the initiating WAP to all follower WAPs in range of the wireless notification. In an embodiment of the invention IEEE 802.11 compliant virtual access control messaging such as Request to Send (RTS) and Clear to Send (CTS) packets can be used to achieve more granular changeovers of primary beams for the initiator and follower WAPS.

Figure 4:
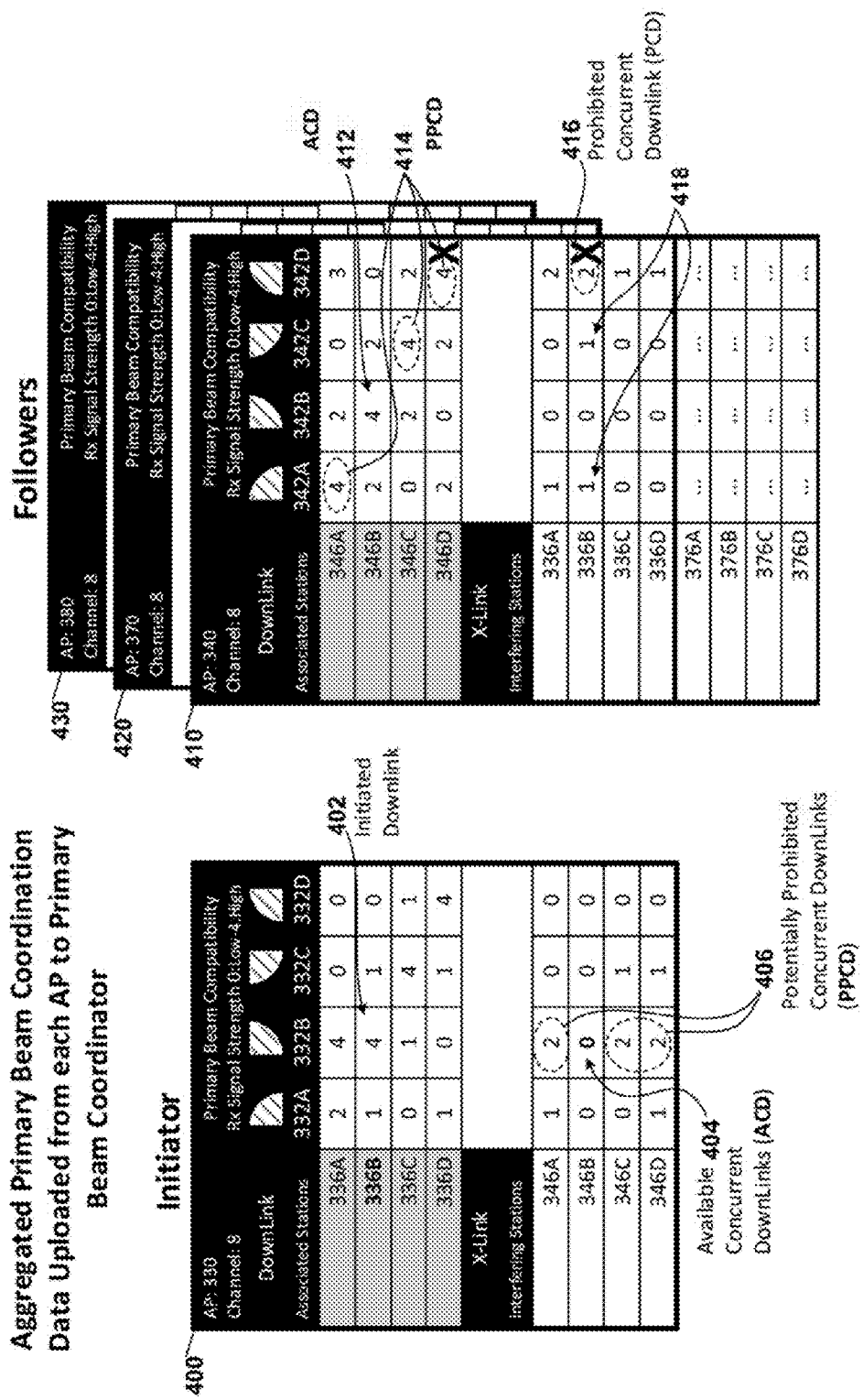
FIG. 4 is a data structure diagram showing representative primary beam coordination data uploaded by a primary beam coordinator and the extrapolation of that data into spatially distinct primary beam setup options for distribution to each WAP.

FIG. 4 is a data structure diagram showing representative primary beam coordination data uploaded by a primary beam coordinator and the extrapolation of that data into spatially distinct primary beam setup options for distribution to each WAP in accordance with an embodiment of the invention. The primary beam coordination data 400, 410, 420, 430 uploaded by WAPs 330, 340, 370, 380 respectively to the primary beam coordinator is shown. It includes in this embodiment of the invention CSI information for each link with an associated station and each crosslink a.k.a. X-link from interfering stations for each of several primary beam patterns. In table 400 from WAP 330 the crosslinks from station 370 are not shown even though they are on the same channel, because the stations 340 and 370 are so far apart as not to experience interference from one another. Each combination of crosslink and link is ranked in terms of received signal strength for each of the primary beam patterns. When it is determined which station is the initiator with CSMA access to the shared control medium the primary beam coordinator proceeds to extrapolate the requisite primary beam setup options for the initiator WAP and each follower WAP as follows in an embodiment of the invention. In the example shown the initiator WAP is WAP 330 which is initiating a downlink to station 336B. The best primary beam option 402 with the highest signal strength, e.g. "4" is primary beam pattern 332B. Next a determination is made as to all non-associated stations as to which may or may not be suitable targets for a concurrent downlink from their associated WAP. In this case the stations associated with neighboring WAP 340 are ranked in terms of interference. The station 346B appears to have no interference with the selected beam pattern 332B and appears to qualify as an available concurrent downlink 404 once the associated WAP is notified. Remaining stations 346A, 346C, 346D all appear to present significant interference with beam pattern 332B and thus are temporarily categorized as potentially prohibited concurrent downlinks 406. Further evaluation of these potentially prohibited downlinks is however required and that is performed in conjunction with the associated primary beam coordination table 410 for neighboring WAP 340. The optimal primary beam pattern for the station available for concurrent downlink, e.g. station 346B is determined 412 to be primary beam pattern 342B. This extrapolated option is the first included in the download of primary beam coordination options downloaded to this follower. The optimal beam patterns for the remaining options 414 involving potentially prohibited concurrent downlinks are also evaluated. Of those downlinks downlink to station 336B using beam pattern 342D appears to be prohibited 416 on the basis of significant interference with the initiators downlink. Remaining downlink options 418 appear to be eligible for concurrent transmissions based on low levels of interference with the initiators downlink. All options and their relative interference levels are downloaded to the associated follower WAPs. This extrapolation of initiator and follower options varies each time a new WAP obtains access to the medium.

FIGS. 5A-C are detailed hardware block diagrams of a wireless access point (WAP) showing alternate embodiments of the invention for generating a composite beam for downlink communications including a primary beam specified by the primary beam coordinator and secondary beam determined by each WAP.

FIG. 5A is a detailed hardware block diagram of the transmit portion of a WAP which includes an electronically steerable phased array coupled between the antenna 550A-H and the radio frequency stage 530 for generating the steerable primary beam specified by the primary beam coordinator. The number of antennas, e.g. "8", is significantly greater than the number of chains, e.g. "4". The WAP 330 in this embodiment of the invention includes a wired Local Area Network (LAN) interface for coupling the WLAN stage 520 to the Internet and to the primary beam coordinator via a packet based bus 504. The WLAN stage includes a baseband portion 522, a radio frequency portion 530, and an electronically steerable or spatially selectable primary beam module 540 coupled to the MIMO antennas 550A-H. The WLAN stage supports 4 chains each capable of handling different data. The baseband components include encoder and mappers 524A-D each coupled to the spatial mapper 526 for frequency domain mapping of the secondary beam patterns onto the data transmitted on each tone or sub-channel. The transmitted data of each chain is converted from the frequency to the time domain in the Inverse Discrete Fourier Transform modules (IDFT) 528A-D and presented to the RF stage 530. In the RF stage 530 each chain is subject to a digital-to-analog conversion (DAC) in DACs 532A-D and subsequent upconversion in upconverters 536A-D. The upconverters are driven by a common oscillator 534. Next each upconverted transmit chain is input to the primary beam module. The cross fabric switch 541 at the input thereof couples each of the four chains to each of the eight antennas in discrete antenna drivers 542A-H. Each driver allows adjustment of the phases and amplitudes of each of the four chains input via mixer to each antenna. Antenna driver 542A includes phase adjusters 544A-D coupled to power amplifiers 546A-D the outputs of which are combined in mixer 548 A which is coupled to the associated one of the MIMO phased array antenna 550A.

The composite beam is generated from the superposition of the primary beams beamsteering matrix "B" and the secondary beams beamsteering matrices "P". The slow varying frequency independent primary beamsteering matrix 543 "B" is used to drive the phase and amplitude adjustments of the primary beam module. The frequency dependent fast varying secondary beam(s) are generated with the secondary sub-channel beamsteering matrix "P".

The primary beam servo 506 couples via the packet bus 504 to the primary beam module to control its operations using the primary beam setup options from the primary beam controller. The primary beam servo is shown with an associated memory storage 518 which may be used to store the primary beam setup options 519 downloaded from the primary beam coordinator. The primary beam servo module is coupled to a primary beam coordinator via the primary beam coordinator interface 508. The primary beam servo module is configured to accept therefrom spatially distinct primary beam pattern setup options and to select therefrom a corresponding one of the primary beam options together with its associated stations and to generate the corresponding selected primary beam option for subsequent downlink communications to at least one of the associated subset of stations; thereby increasing a downlink throughput of the WLAN via non-interfering concurrent downlink communications from each of the plurality of WAPs.

The primary beam servo also includes: a link and crosslink monitor 516, a notifier 510, a primary beam mode selector 512, and a primary beam driver 514. The link and crosslink monitor 516, monitors channel state information (CSI) for communication links and crosslinks between each WAP node and both associated and non-associated station nodes thereof. The notifier 510, is operative during initiation of a downlink to notify remaining ones of the plurality of WAPs of at least one of: the primary beam and station nodes associated with the downlink, and spatially distinct primary beams and associated stations compatible therewith, thereby avoiding a requirement for contact with the primary beam coordinator. The primary beam mode selector 512, is operative in an initiator mode to gain initial access to the WLAN for a selected downlink to an associated at least one target station node via a first primary beam identified by the primary beam coordinator, and operative in a follower mode to gain subsequent access to the WLAN and to asynchronously initiate a concurrent WLAN downlink to another at least one associated target station node using another primary beam identified by the primary beam coordinator which is spatially distinct from the primary beam utilized by another one of the plurality of WAPs operative as an initiator for its discrete downlink. The primary beam mode selector is also operative to generate a one primary beam pattern specified by the primary beam coordinator for downlink communications to the stations associated therewith, and in a follower mode to choose a subset of spatially distinct primary beam pattern setup options which are identified in the options as spatially consistent with the primary beam pattern selected by an initiating one of the WAPs for subsequent downlink communications to at least one of the associated station nodes; thereby allowing downlink follower WAPs to restrictively select downlink primary beam patterns from an identifiable subset of the setup options based on relative downlink demand between associated stations. The primary beam driver handles the setup of the primary beam module 540.

FIG. 5B is a detailed hardware block diagram of the transmit portion of an alternate-embodiment of a WAP which includes electronically steerable parasitic antennas (ESPAR) coupled with a primary beam module 560 between the radio frequency stage 530 and the four parasitic antennas 566A-D. There is one steerable parasitic antenna for each chain. Each parasitic antenna includes a driven element 567 and parasitic elements 568 for shaping the resultant beam under control of the electronically tunable reactances in each antenna driver 562A-D. The primary beam matrix "B" is used to drive the Primary beam module and the secondary beam matrix "P" is used to drive the spatial mapping of each tone in the spatial mapper 525.

FIG. 5C is a detailed hardware block diagram of the transmit portion of an alternate embodiment of a WAP which includes a WAP with antennas 572A-D driven by power amplifiers 570A-D coupled to the aforesaid remaining RF components and baseband components discussed above. In order for this embodiment of the invention to be practicable the number of streams of data must be less then the number of chains in a configuration commonly referred to as massive MIMO configuration. In this embodiment of the invention the beamforming matrix is obtained at the baseband as the product of two matrices: "B" that depends on slowly-varying channel effects that are constant over time and frequency and "P" that depends on the instantaneous channel state information and that can depend on frequency.

FIG. 6 is a hardware block diagram at a system level of both a server 302 incorporating a primary beam coordinator 674 coupled to all WAPs 330 and 648 via a wired LAN connection 303 and the primary beam servo, e.g. servo 600 in WAP 303.

The WAP 330 includes in this embodiment of the invention a LAN interface 618 coupled via a packet bus 620 to the WLAN stage 621. The transmit and receive path components of the WLAN stage are shown. In the base band portion 622 of the WLAN stage the transmit path components include encoder mappers 624 and spatial mapper 628.

The spatial mapper is driven with the secondary beamsteering matrix "P". The output of each chain is converted from the frequency to the time domain by an associate IDFT 630A-B. The output of the IDFT is input to the RF stage 632 for up conversion and input to the primary beam module 634. That module accepts input of the primary beam's beamsteering matric 636 "B". In the embodiment shown the primary beam module is coupled to phased array antennas 638 to transmit downlink communications over WLAN 640 to associated stations e.g. station 346C. On the receive path received communications are passed from the primary beam module to the RF module for down conversion. Next the received communications are transformed from the time to the frequency domain in the discrete Fourier transform (DFT) components 734A-B. The received communications on each tone are then equalized in the equalizer and demapped and decoded in the demapper and decoder component 626. A microprocessor 612 is shown with associated memory 614 for storing the primary beam setup options 616 downloaded from the primary beam coordinator. The microprocessor is used to instantiate the primary beam servo 600. The primary beam servo includes: the primary beam coordinator interface 602, the link and crosslink monitor 610, the notifier 604, the primary beam mode selector 606 and the primary beam driver 608. The primary beam servo performs identically to the modules discussed above in connection with FIG. 5A.

The server 302 is coupled to each WAP via the wired LAN connection 303. The server includes microprocessor 650 and memory 652 for storing the correlated primary beam coordination tables 519. The server includes a bus 654 coupling the microprocessor to read-only memory 656, main memory 658, a network interface 670, and input\output device (I/O) interface 672 for interfacing with a keyboard and display for example.

The primary beam coordinator may be instantiated via the microprocessor 650. It includes the WAP interface 676 the link aggregator 678, the cross correlator 680 for Primary beams and associated stations and links, and the distributor 682 for distributing primary beam options. The cross correlator is used to correlate from the uploaded CSI information for communication links and crosslinks between each WAP node and both associated and non-associated station nodes thereof and extrapolate therefrom spatially distinct primary beam pattern setup options to each of the plurality of WAP nodes which enable substantially non-interfering concurrent downlink communications between each WAP node and a corresponding subset of its associated station nodes within each associated spatially distinct primary beam.

FIGS. 7A-B are process flow diagrams of the processes associated with coordinating concurrent WLAN links on both the primary beam coordinator coupled to all WAPs and the primary beam servo in each WAP, in accordance with an embodiment of the current invention.

FIG. 7A is the process flow diagram for each WAP's primary beam servo. Processing begins with the next link determination 700. If the next link is an uplink control passes to process 710. In process 710 the WAP monitors link and crosslink Channel State Information (CSI) from links of associated stations and from crosslinks from unassociated stations sharing the same WiFi channel as WAP. The WAP monitors slow varying semi-stable frequency independent channel characteristics such as signal strength or covariance Matrix [B] which will be used to evaluate primary beam patterns. Next in process 712 the monitored information from process 710 is uploaded to the Primary Beam Coordinator. Control then returns to decision process 700.

If alternately in decision process 700 a determination is made that the next link is a downlink, control passes to decision process 720. In decision process 720 a determination is made as to whether the WAP is currently operative as an initiator who consistent with the CSMA\CA protocol has gained access to the channel or is a follower whose access to the channel is "blocked". If a determination is made that the WAP is currently operative as an initiator then control passes to process 722. In process 722 the WAP obtains the identifiable Primary Beam Setup Options for its target downlink station(s). In a reactive embodiment of the invention this may involve a request to the primary beam coordinator for download of the relevant primary beam setup options. In a proactive embodiment of the invention the WAP identifies that it already has a valid set of primary beam setup options previously downloaded from the primary beam coordinator. Next control is passed to process 724 in which the WAP selects one of the primary beam options available to it for whichever station target(s) it wishes to downlink. Next in process 726 the WAP generates a composite beam for the selected downlink including: the identified primary beam for the target station(s) and superimposed thereon whatever secondary beams are determined from channel soundings. Control is then passed to process 728. If notification to the primary beam coordinator is required as to which among the primary beam options was selected and what the downlink stations are, then that notification is performed in this step. In another embodiment of the invention where the WAPs proactively download the coordination options from the primary beam controller a notification may be made by the WAP directly to follower WAPs as to which primary beam was selected by the WAP or alternately which primary beams should be selected by the followers. In any event, control then returns to decision process 700 for the processing of the next link.

If alternately a determination is made in decision process 720 that the WAP is operative as a follower then control passes to process 730. In process 730 the WAP obtains identifiable non-interfering primary beam setup options and associated prospective target station(s) from the primary beam controller by lookup of options previously downloaded therefrom. Control is then passed to process 732 in which the WAP selects one of the non-interfering primary beam option(s) and associated target station(s) for downlink. Then in the following step 734 the WAP generates the composite beam for the downlink including: a selected non-interfering primary beam for the associated target station(s) and superimposes that with the secondary beam(s) determined by channel soundings of the downlink. Control then returns to decision process 700 for the processing of the next link.

FIG. 7B is the process flow diagram for the server's primary beam coordinator. Processing begins with process 750 in which the primary beam coordinator aggregates the primary beam coordination data from WAPs for each link and crosslink to associated and unassociated station nodes. Next in process 752 the primary beam coordinator identifies for the CSMA initiator WAP the optimal primary beam pattern or shapes for the requested downlink target station(s). Control then passes to process 754 in which each primary beam and subset of associated stations for each initiator WAP is cross correlated with associated primary beam pattern(s) and downlink station(s) candidates for remaining follower WAPs on the WLAN grid sharing the same channel. Then control passes to process 756 for dissemination of primary beam setup options and associated parameters to the initiator WAP and all follower WAPs. Control then returns to process 750.

Brief Description of Composite BF

In linear beamforming (standard prior art) the sequence x[t,f], t=1, 2, ..., N is transmitted over N OFDM symbols forming a slot (frame) from the M base station antennas. The beamforming matrix V is a function of the instantaneous Channel State Information (CSI), that changes from frame to frame and it is estimated via the uplink pilot signals. Specifically x[t,f]=V[f]d[t,f], t=1,2, ..., N where x[t,f] is the M-dimensional signal vector (complex I-Q coefficients) at OFDM symbol t, subcarrier f, V is the beamforming matrix for OFDM subcarrier f, constant over a frame of N OFDM symbols, and d is the S-dimensional information data vector (each component is a QAM modulation symbol to be transmitted at OFDM symbol t, subcarrier f.)

In linear composite beamforming the beamforming matrix is obtained as the product of two matrices B that depends on slowly-varying channel statistical effects and it is constant over time and frequency, and P that depends on the instantaneous channel state information, and can depend on f:

x[t,f]=BP[f]d[t,f], t=1, ..., N

Since B is constant in frequency, it can be implemented in the time domain in the analog RF front end, either by a phased array or, under some constraints, through a set of reconfigurable beam-steering parasitic antennas.

Brief Description of Estimation of Slow Statistics

The fundamental information about the channel statistics needed to compute B in the case of an antenna array is the channel sample covariance matrix, given by:

$$\hat{R} = \frac{1}{TF}\sum_{f=1}^{F}\sum_{t=1}^{T} h[t,f]h^H[t,f]$$

This can be obtained by estimating uplink channels from uplink pilot signals, and computing the above arithmetic mean summing both over time (frames) and over frequency (subcarriers) where T is the number of frames, F the number of subcarriers, and h is the channel matrix.

When the antenna array is implemented in the analog RF domain and only b<M RF chains exist, such that we cannot observe the channel coefficients at all the M antennas, the sample covariance matrix can be obtained from a sufficiently large number m of quadratic projections, $r_i$, in the form:

$$\hat{r}_i = \frac{1}{TF}\sum_{f=1}^{F}\sum_{t=1}^{T} |a_i^H h[t,f]|^2, i = 1, \ldots, m$$

using appropriately defined "test vectors" $a_i$, i=1 ... m.

When the B matrix in composite BF is implemented by electronically steerable parasitic antennas (ESPAR), then we can only record the signal strength received from the uplink on given beam configurations. Mathematically, a beamforming configuration is defined by a steering vector $a_i$, for i=1, ..., m, and m is the number of possible configurations. Hence, the received signal power takes again the form:

$$\hat{r}_i = \frac{1}{TF}\sum_{f=1}^{F}\sum_{t=1}^{T} |a_i^H h[t,f]|^2, i = 1, \ldots, m$$

where now $a_i$, i=1 ... m, denotes the possible beam configurations of the ESPAR.

The components and processes disclosed herein may be implemented a software, hardware, firmware, or a combination thereof, without departing from the scope of the Claimed Invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A system for coordinating a wireless local area network including a plurality of multiple-input multiple-output (MIMO) wireless access point (WAP) nodes each supporting wireless local area network (WLAN) communications with an associated set of station nodes on a shared orthogonal frequency-division multiplexed (OFDM) communication channel; and the system comprising:

a primary beam coordinator coupled to the plurality of WAP nodes and configured to aggregate channel state information (CSI) for communication links and cross-links between each WAP node and both associated and non-associated station nodes thereof and to extrapolate therefrom spatially distinct primary beam pattern setup options to each of the plurality of WAP nodes to enable substantially non-interfering concurrent downlink communications between each WAP node and a corresponding subset of its associated station nodes within each associated spatially distinct primary beam; and the plurality of WAP nodes each coupled to the primary beam coordinator and configured to select a corresponding one of the primary beam options together with its associated station nodes as provided by the primary beam coordinator and to generate the corresponding selected primary beam option for subsequent downlink communications to at least one of the associated subset of station nodes; and further to generate a composite beam for each downlink including a superposition of a primary beam extrapolated by the primary beam coordinator from relatively slow varying parameters of the aggregated CSI together with a secondary beam generated locally by each WAP from relatively fast varying channel information derived from explicit or implicit channel soundings between each WAP and at least one associated target station node selected by the WAP for downlink and falling within the associated primary beam; thereby increasing a downlink throughput of the WLAN via non-interfering concurrent downlink communications thereon.

2. A system for coordinating a wireless local area network including a plurality of multiple-input multiple-output (MIMO) wireless access point (WAP) nodes each supporting wireless local area network (WLAN) communications with an associated set of station nodes on a shared orthogonal frequency-division multiplexed (OFDM) communication channel; and the system comprising:

a primary beam coordinator coupled to the plurality of WAP nodes and configured to aggregate channel state information (CSI) for communication links and cross-links between each WAP node and both associated and non-associated station nodes thereof and to extrapolate therefrom spatially distinct primary beam pattern setup options to each of the plurality of WAP nodes to enable substantially non-interfering concurrent downlink communications between each WAP node and a corresponding subset of its associated station nodes within each associated spatially distinct primary beam; and the plurality of WAP nodes each coupled to the primary beam coordinator and configured to select a corresponding one of the primary beam options together with its associated station nodes as provided by the primary beam coordinator and to generate the corresponding selected primary beam option for subsequent downlink communications to at least one of the associated subset of station nodes; and to operate either as an initiator gaining initial access to the WLAN for a selected downlink to an at least one associated target station node via a first primary beam identified by the primary beam coordinator, or a follower gaining subsequent access to the WLAN and asynchronously initiating a concurrent WLAN downlink to another at least one associated target station node using another primary beam identified by the primary beam coordinator which is spatially distinct from the primary beam utilized by the initiator for its discrete downlink; thereby increasing a downlink throughput of the WLAN via non-interfering concurrent downlink communications thereon.

3. A system for coordinating a wireless local area network including a plurality of multiple-input multiple-output (MIMO) wireless access point (WAP) nodes each supporting wireless local area network (WLAN) communications with an associated set of station nodes on a shared orthogonal frequency-division multiplexed (OFDM) communication channel; and the system comprising:

a primary beam coordinator coupled to the plurality of WAP nodes and configured to aggregate channel state information (CSI) for communication links and cross-links between each WAP node and both associated and non-associated station nodes thereof and to extrapolate therefrom spatially distinct primary beam pattern setup options to each of the plurality of WAP nodes to enable substantially non-interfering concurrent downlink communications between each WAP node and a corresponding subset of its associated station nodes within each associated spatially distinct primary beam; and the plurality of WAP nodes each coupled to the primary beam coordinator and configured to select a corresponding one of the primary beam options together with its associated station nodes as provided by the primary beam coordinator and to generate the corresponding selected primary beam option for subsequent downlink communications to at least one of the associated subset of station nodes and to periodically download primary beam coordination tables from the primary beam coordinator and as a downlink initiator to notify remaining ones of the plurality of WAPs of at least one of: the primary beam and station nodes associated with the downlink, and spatially distinct primary beams and associated stations compatible therewith, thereby avoiding a requirement for contact with the primary beam coordinator; thereby increasing a downlink throughput of the WLAN via non-interfering concurrent downlink communications thereon.

4. A system for coordinating a wireless local area network including a plurality of multiple-input multiple-output (MIMO) wireless access point (WAP) nodes each supporting wireless local area network (WLAN) communications with an associated set of station nodes on a shared orthogonal frequency-division multiplexed (OFDM) communication channel; and the system comprising:

a primary beam coordinator coupled to the plurality of WAP nodes and configured to aggregate channel state information (CSI) for communication links and cross-links between each WAP node and both associated and non-associated station nodes thereof and to extrapolate therefrom spatially distinct primary beam pattern setup options to each of the plurality of WAP nodes to enable substantially non-interfering concurrent downlink communications between each WAP node and a corresponding subset of its associated station nodes within each associated spatially distinct primary beam; and the plurality of WAP nodes each coupled to the primary beam coordinator and configured to select a corresponding one of the primary beam options together with its associated station nodes as provided by the primary beam coordinator and to generate the corresponding selected primary beam option for subsequent downlink communications to at least one of the associated subset of station nodes and as a downlink initiator to generate a one primary beam pattern specified in the primary beam pattern setup options from the primary beam coordinator for downlink communications to the stations associated therewith, and as a downlink follower to choose a subset of the spatially distinct primary beam pattern setup options which are identified in the options as spatially consistent with the primary beam pattern selected by an initiating one of the WAPs for subsequent downlink communications to at least one of the associated station nodes; thereby allowing downlink follower WAPs to restrictively select downlink primary beam patterns from an identifiable subset of the setup options based on relative downlink demand between associated stations; thereby increasing a downlink throughout of the WLAN via non-interfering concurrent downlink communications thereon.

5. A wireless access point (WAP) apparatus compatible with a system for coordinating a wireless local area network including a plurality of multiple-input multiple-output (MIMO) wireless access point (WAP) nodes each supporting wireless local area network (WLAN) communications with an associated set of station nodes on a shared orthogonal frequency-division multiplexed (OFDM) communication channel; and the WAP comprising:

a plurality of antenna;

a plurality of shared and discrete components coupled to one another to form transmit and receive chains each coupled to a corresponding one of the plurality of antenna for OFDM MIMO WLAN communications with the associated set of station nodes;

a primary beam servo module coupled to a primary beam coordinator and configured to accept therefrom spatially distinct primary beam pattern setup options and to select therefrom a corresponding one of the primary beam options together with its associated stations and to generate the corresponding selected primary beam option for subsequent downlink communications to at least one of the associated subset of stations; thereby increasing a downlink throughput of the WLAN via non-interfering concurrent downlink communications from each of the plurality of WAPs; and a primary beam driver coupled to the plurality of components on the transmit path to generate a composite beam for each downlink including a superposition of the primary beam extrapolated by the primary beam coordinator from relatively slow varying parameters of the aggregated CSI from each of the plurality of WAP nodes together with a secondary beam generated locally by the WAP apparatus from relatively fast varying channel information derived from explicit or implicit channel soundings between the WAP and at least one associated target station node selected by the WAP for downlink and falling within the associated primary beam.

6. A wireless access point (WAP) apparatus compatible with a system for coordinating a wireless local area network including a plurality of multiple-input multiple-output (MIMO) wireless access point (WAP) nodes each supporting wireless local area network (WLAN) communications with an associated set of station nodes on a shared orthogonal, frequency-division multiplexed (OFDM) communication channel; and the WAP comprising:

a plurality of antenna;

a plurality of shared and discrete components coupled to one another to form transmit and receive chains each coupled to a corresponding one of the plurality of antenna for OFDM MIMO WLAN communications with the associated set of station nodes;

a primary beam servo module coupled to a primary beam coordinator and configured to accept therefrom spatially distinct primary beam pattern setup options and to select therefrom a corresponding one of the primary beam options together with its associated stations and to generate the corresponding selected primary beam option for subsequent downlink communications to at least one of the associated subset of stations; thereby increasing a downlink throughput of the WLAN via non-interfering concurrent downlink communications from each of the plurality of WAPs; and a primary beam mode selector coupled to the plurality of components on the transmit path and operative in an initiator mode to gain initial access to the WLAN for a selected downlink to an associated at least one target station node via a first primary beam identified by the primary beam coordinator, and operative in a follower mode to gain subsequent access to the WLAN and to asynchronously initiate a concurrent WLAN downlink to another at least one associated target station node using another primary beam identified by the primary beam coordinator which is spatially distinct from the primary beam utilized by another one of the plurality of WAPs operative as an initiator for its discrete downlink.

7. A wireless access point (WAP) apparatus compatible with a system for coordinating a wireless local area network including a plurality of multiple-input multiple-output (MIMO) wireless access point (WAP) nodes each supporting wireless local area network (WLAN) communications with an associated set of station nodes on a shared orthogonal frequency-division multiplexed (OFDM) communication channel; and the WAP comprising:

a plurality of antenna;

a plurality of shared and discrete components coupled to one another to form transmit and receive chains each coupled to a corresponding one of the plurality of antenna for OFDM MIMO WLAN communications with the associated set of station nodes;

a primary beam servo module coupled to a primary beam coordinator and configured to accept therefrom spatially distinct primary beam pattern setup, options and to select therefrom a corresponding one of the primary beam options together with its associated stations and to generate the corresponding selected primary beam option for subsequent downlink communications to at least one of the associated subset of stations; thereby increasing a downlink throughput of the WLAN via non-interfering concurrent downlink communications from each of the plurality of WAPs;

a primary beam coordinator interface configured to couple to the primary beam coordinator to periodically download primary beam coordination tables therefrom; and a notifier module operative during initiation of a downlink to notify remaining ones of the plurality of WAPs of at least one of: the primary beam and station nodes associated with the downlink, and spatially distinct primary beams and associated stations compatible therewith, thereby avoiding a requirement for contact with the primary beam coordinator.

8. A wireless access point (WAP) apparatus compatible with a system for coordinating a wireless local area network including a plurality of multiple-input multiple-output (MIMO) wireless access point (WAP) nodes each supporting wireless local area network (WLAN) communications with an associated set of station nodes on a shared orthogonal frequency-division multiplexed (OFDM) communication channel; and the WAP comprising:

a plurality of antenna;

a plurality of shared and discrete components coupled to one another to form transmit and receive chains each coupled to a corresponding one of the plurality of antenna for OFDM MIMO WLAN communications with the associated set of station nodes;

a primary beam servo module coupled to a primary beam coordinator and configured to accept therefrom spatially distinct primary beam pattern setup options and to select therefrom a corresponding one of the primary beam options together with its associated stations and to generate the corresponding selected primary beam option for subsequent downlink communications to at least one of the associated subset of stations; thereby increasing a downlink throughput of the WLAN via non-interfering concurrent do link communications from each of the plurality of WAPs; and a primary beam mode selector coupled to the plurality of components on the transmit path and operative in an initiator mode to generate a one primary beam pattern specified by the primary beam coordinator for downlink communications to the stations associated therewith, and in a follower mode to choose a subset of spatially distinct primary beam pattern setup options which are identified in the options as spatially consistent with the primary beam pattern selected by an initiating one of the WAPs for subsequent downlink communications to at least one of the associated station nodes; thereby allowing downlink follower WAPs to restrictively select downlink primary beam patterns from an identifiable subset of the setup options based on relative downlink demand between associated stations.

9. A method for coordinating a wireless local area network including a plurality of multiple-input multiple-output (MIMO) wireless access point (WAP) nodes each supporting wireless local, area network (WLAN) communications with an associated set of station nodes on a shared orthogonal frequency-division multiplexed (OFDM) communication channel; and the method comprising:

aggregating channel state information (CSI) for communication links and crosslinks between each WAP and both associated and non-associated station nodes thereof;

extrapolating from said aggregated CSI, spatially distinct primary beam pattern setup options for each of the plurality of WAP nodes to enable substantial non-interfering concurrent downlink communications between each WAP and a corresponding subset of its associated stations within each associated spatially distinct primary beam;

selecting for each WAP a corresponding one of the primary beam options together with its associated stations as extrapolated in the extrapolating act;

generating on each WAP the corresponding selected primary beam option for subsequent downlink communications to at least one of the associated subset of stations; and generating on each WAP a composite beam for each downlink including a superposition of a primary beam extrapolated in the extrapolating act from relatively slow varying parameters of the aggregated CSI together with a secondary beam generated locally by each WAP from relatively fast varying channel information derived from explicit or implicit channel soundings between each WAP and at least one associated target station node selected by the WAP for downlink and falling within the associated primary beam; thereby increasing a downlink throughput of the WLAN via non-interfering concurrent downlink communications thereon.

10. A method for coordinating wireless local area network including a plurality of multiple-input multiple-output (MIMO) wireless access point (WAP) nodes each supporting wireless local area network (WLAN) communications with an associated set of station nodes on a shared orthogonal frequency-division multiplexed (OFDM) communication channel; and the method comprising:

aggregating channel state information (CSI) for communication links and crosslinks between each WAP and both associated and non-associated station nodes thereof;

extrapolating from said aggregated CSI, spatially distinct primary beam pattern setup options for each of the plurality of WAP nodes to enable substantially non-interfering concurrent downlink communications between each WAP and a corresponding subset of its associated stations within each associated spatially distinct primary beam;

selecting for each WAP a corresponding one of the primary beam options together with its stations as extrapolated in the extrapolating act; and operating each of the plurality of WAPs either as an initiator gaining initial access to the WLAN for a selected downlink to an associated at least one target station node via a first primary beam identified in the extrapolating act, or a follower gaining subsequent access to the WLAN and asynchronously initiating a concurrent WLAN downlink to another at least one associated target station node using another primary beam identified in the extrapolating act which is spatially distinct from the primary beam utilized by the initiator for its discrete downlink; and generating on each WAP the corresponding selected primary beam option for subsequent downlink communications to at least one of the associated subset of stations; thereby increasing a downlink throughput of the WLAN via non-interfering concurrent downlink communications thereon.

11. A method for coordinating a wireless local area network including a plurality of multiple-input multiple-output (MIMO) wireless access point (WAP) nodes each supporting wireless local area network (WLAN) communications with an associated set of station nodes on a shared orthogonal frequency-division multiplexed (OFDM) communication channel; and the method comprising:

aggregating channel state information (CSI) for communication links and crosslinks between each WAP and both associated and non-associated station nodes thereof;

extrapolating from said aggregated CSI, spatially distinct primary beam pattern setup options for each of the plurality of WAP nodes to enable substantially non-interfering concurrent downlink communications between each WAP and a corresponding subset of its associated stations within each associated spatially distinct primary beam;

selecting for each WAP a corresponding one of the primary beam options together with its associated stations as extrapolated in the extrapolating act;

generating on each WAP the corresponding selected primary beam option for subsequent downlink communications to at least one of the associated subset of stations; thereby increasing a downlink throughput of the WLAN via non-interfering concurrent downlink communications thereon:

periodically downloading on each of the plurality of WAP nodes the spatially distinct primary beam pattern setup option extrapolated in the extrapolating act; and notifying remaining ones of the plurality of WAPs of at least one of: the primary beam and station nodes associated with the downlink, and spatially distinct primary beams and associated stations compatible therewith.

12. A method for coordinating a wireless local area network including a plurality of multiple-input multiple-output (MIMO) wireless access point (WAP) nodes each supporting wireless local area network (WLAN) communications with an associated set of station nodes on a shared orthogonal frequency-division multiplexed (OFDM) communication channel; and the method comprising: aggregating channel state information (CSI) for communication links and crosslinks between each WAP and both associated and non-associated station nodes thereof;

extrapolating from said aggregated CSI, spatially distinct primary beam pattern setup options for each of the plurality of WAP nodes to enable substantially non-interfering concurrent downlink communications between each WAP and a corresponding subset of its associated stations within each associated spatially distinct primary beam;

selecting for each WAP a corresponding one of the primary beam options together with its associated stations as extrapolated in the extrapolating act;

selectably operating each of the plurality of WAPs either as a downlink initiator or a downlink follower;

generating as a downlink initiator a one primary beam pattern extrapolated in the extrapolating act for downlink communications to the station nodes associated therewith; and choosing as a downlink follower other spatially distinct primary beam patterns for subsequent downlink communications to at least one of the associated station nodes; thereby allowing downlink follower WAPs to independently select downlink primary beam patterns based on relative downlink demand between associated stations; and generating on each WAP the corresponding selected primary beam option for subsequent downlink communications to at least one of the associated subset of stations; thereby increasing a downlink throughput of the WLAN via non-interfering concurrent downlink communications thereon.

* * * * *